Figure 3:
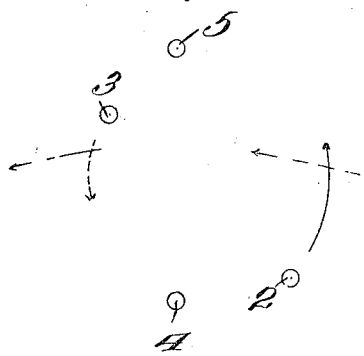

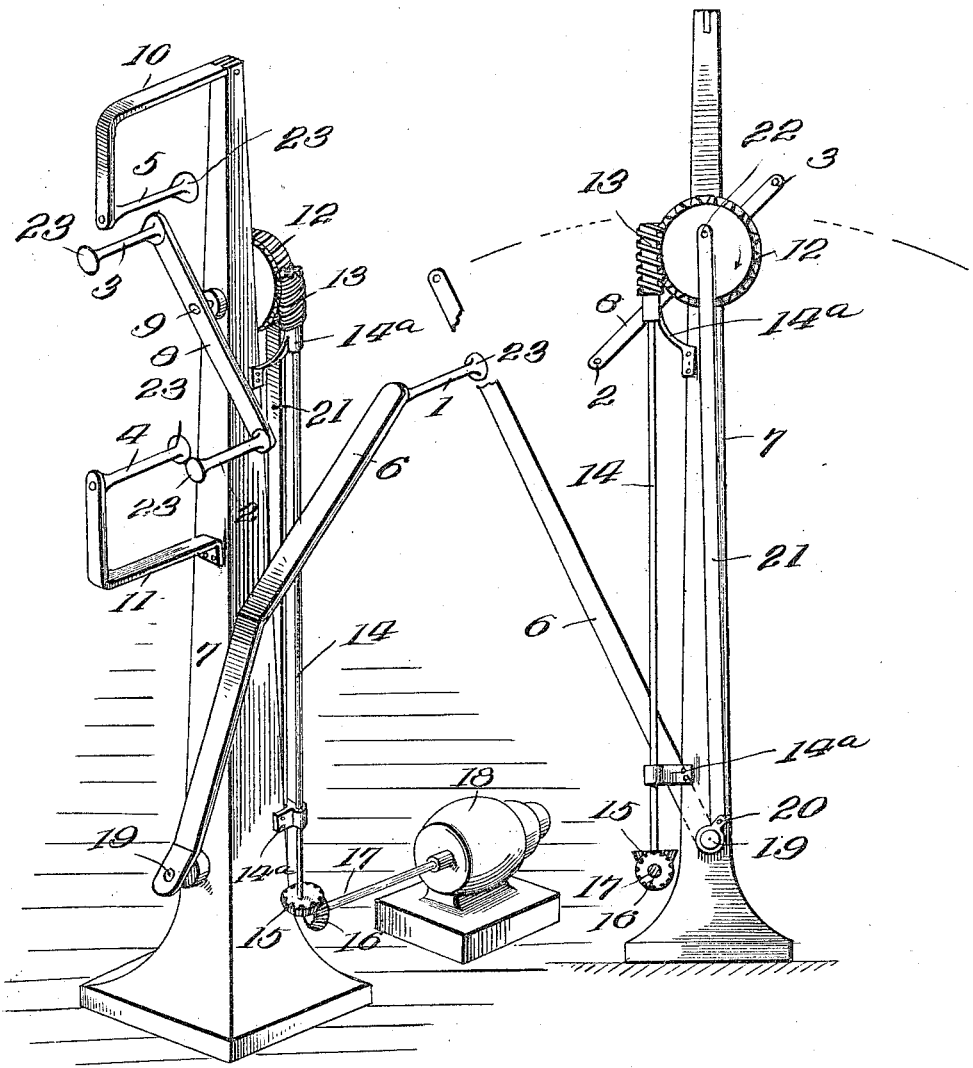

E. F. McCARTHY & E. W. WILSON.
CANDY PULLING MACHINE.
APPLICATION FILED JULY 28, 1914.

1,139,786.

Patented May 18, 1915.

Inventors
E. F. McCarthy
E. W. Wilson

Witnesses

By

Attorneys.

E. F. McCARTHY & E. W. WILSON.
CANDY PULLING MACHINE.
APPLICATION FILED JULY 28, 1914.
1,139,786.
Patented May 18, 1915.
3 SHEETS—SHEET 3.
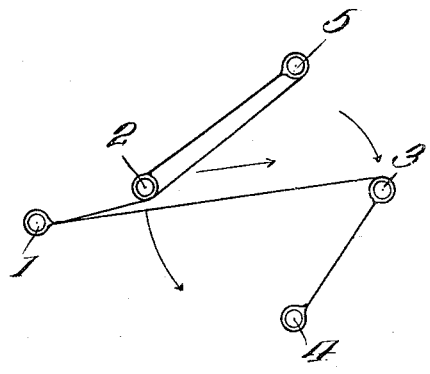
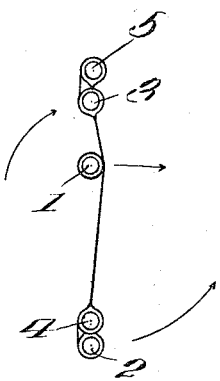
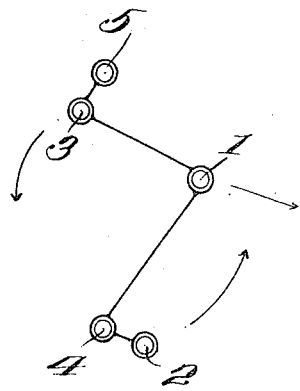
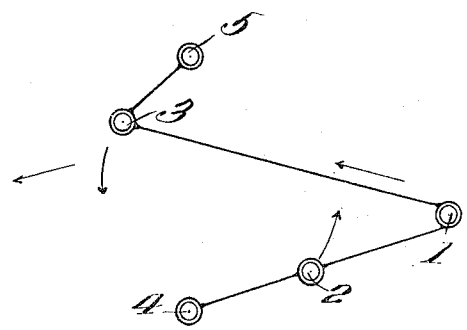
Witnesses
Jno. [illegible]
R. W. Bishop
Inventors
E. F. McCarthy and
E. W. Wilson.
By [illegible], Attorneys.

UNITED STATES PATENT OFFICE.

EDWARD F. McCARTHY AND EDWARD W. WILSON, OF CHICAGO, ILLINOIS.

CANDY-PULLING MACHINE.

1,139,786.  Specification of Letters Patent. Patented May 18, 1915.

Application filed July 28, 1914. Serial No. 853,685.

*To all whom it may concern:*

Be it known that we, EDWARD F. McCARTHY and EDWARD W. WILSON, citizens of the United States, residing at Chicago, in the county of Cook and State of Illinois, have invented certain new and useful Improvements in Candy-Pulling Machines, of which the following is a specification.

This invention relates to candy-pulling machines, and has for its object the provision of a machine which will quickly and thoroughly pull and aerate candy and will operate upon the entire mass of candy placed within its range.

The invention, also, seeks to provide a machine for the stated purpose which will be free of complicated constructions and arrangements of its parts and which will be strong, durable and inexpensive.

These objects are attained in mechanism such as is illustrated in the accompanying drawings and the invention resides in certain novel features which will be particularly pointed out in the claims following the hereinafter given detailed description.

In the accompanying drawings, which illustrate the preferred embodiment of our invention, Figure 1 is a perspective view of a complete machine. Fig. 2 is a rear elevation of the same. Figs. 3 to 11 are diagrammatic views illustrating the operation of the several candy-engaging parts.

In the machine illustrated in the accompanying drawings, the candy-engaging and treating members comprise a plurality of pins 1, 2, 3, 4 and 5. The pin 1 is carried at the upper end of an oscillatory or vibratory arm or lever 6 which is fulcrumed at the lower end of a standard 7 secured in any desired manner upon the floor of the workroom. The pins 2 and 3 are carried by the opposite ends of an arm 8 which is fixed upon a shaft 9 journaled in and extending through the standard 7 near the upper end thereof, the pins 2 and 3 being at unequal distances from the said shaft so that in effect the shaft carries a long arm and a short arm each of which is provided at its extremity with a pin projecting therefrom outwardly with respect to the standard. The pin 1 at the upper end of the lever 6 projects inwardly toward the standard and the pins 4 and 5 likewise project inwardly toward the standard, the pin 5 being rigid with the extremity of a bracket 10 secured to the upper extremity of the standard and projecting outwardly therefrom and then extending downwardly substantially parallel with the standard so that the pin 5 will project from the bracket toward the standard and will terminate in spaced relation to the standard. The pin 4 is carried by the extremity of a bracket 11 which is rigid with the standard below the shaft 9 and extends downwardly therefrom, its end being turned upwardly as shown. The pins 4 and 5 are spaced equi-distant from the shaft 9 and, in the operation of the device, the pin 3 describes a circle which lies between the said pins 4 and 5 while the pin 2 will describe a circle inclosing said pins. The pin 1 will describe an arc passing between the pins 4 and 5 and intersecting the circles described by the pins 2 and 3. Any desired or convenient operating mechanism may be employed so as to impart simultaneous motion to the pins 1, 2 and 3. In the accompanying drawings we have illustrated a worm gear 12 fixed upon the shaft 9 and driven by a worm 13 on the upper end of a shaft 14 which is journaled in brackets 14ª on the standard and is provided with a bevel gear wheel 15 at its lower end. The said gear wheel 15 meshes with a pin 16 upon a driving shaft 17. In the accompanying drawings we have illustrated conventionally an electric motor 18 acting directly upon the said driving shaft but it will be understood that motion may be imparted to the said shaft in any other manner as may be desired. A shaft 19 is journaled in and extends through the standard 7 and has the vibratory lever 6 secured rigidly to its front end. The rear end of this shaft 19 is equipped with a crank arm 20 and the said crank arm is connected by a link 21 to a wrist pin or crank 22 carried by the worm wheel 12. It will be readily understood that by the described arrangement motion will be imparted from the driving shaft 17 through the gear wheel 15 and the shaft 14, the worm 13 and the wheel 12 to the shaft 9 so as to impart a continuous rotary motion to said shaft. The wrist pin or crank 22 will, of course, be continuously rotated and will reciprocate the link 21 which in turn will act upon the crank arm 20 so as to oscillate the said crank and this oscillation will, of course, be transmitted directly to the shaft 19 and the lever 6, the pin 1 being thereby caused to describe an arc of about 60°.

The candy to be treated is, of course, hung upon one of the pins and will be engaged by the moving pins so as to be looped around the same and the stationary pins and will be drawn out by the pins successively engaging it in the operation of the machine. It will be noted that the pin 1 is so disposed as to clear the rotary arm or lever 8 and the pins 4 and 5 are spaced from the standard 7 so that the said rotary arm or lever may readily pass between them and the standard. The spaced relation of the terminals of the pins 4 and 5 to the standard also facilitates the removal of the candy from the machine after it has been sufficiently treated, and to prevent the candy slipping from the pins prematurely while the machine is in operation we enlarge the pins at their free ends so that they are substantially conical as indicated at 23. The ends of the pins may be formed into balls as this construction will permit the ready removal of the treated candy and at the same time will prevent the candy slipping off the pins while it is being treated.

Figure 4:
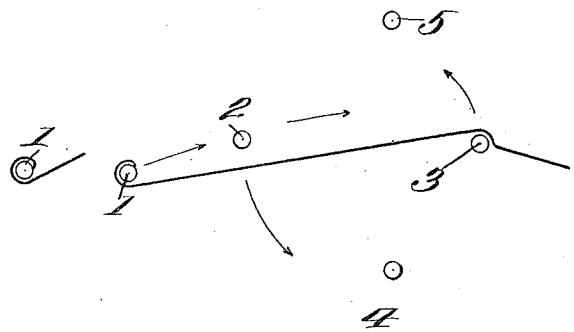
Figure 5:
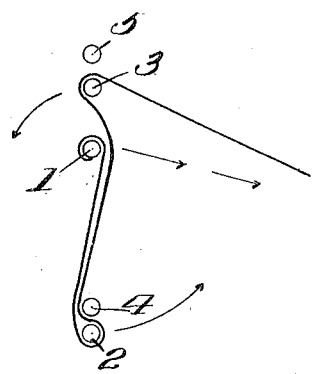
Figure 6:
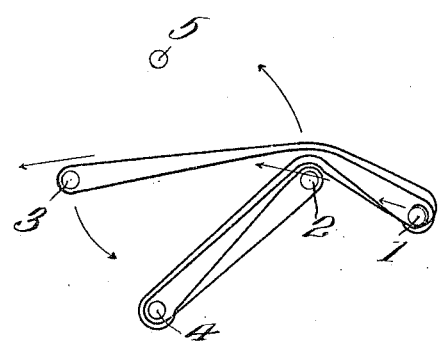
Figure 7:
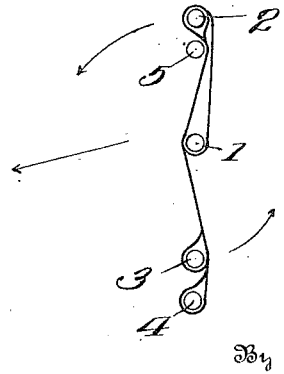

The candy to be treated may be hung upon any of the pins but, as a matter of convenience and safety, it is preferable to place it initially upon the pin 1 carried by the lever 6 for the reason that this lever will be at some distance from the standard and the other pins and the operator is, consequently, not liable to be injured, as will be readily understood upon reference to Figs. 1 and 2 of the drawings. The candy having been looped about the pin 1 the machine is set in operation and the said pin will then be carried to the opposite side of the machine and the rotary arm 8 simultaneously set in motion. The pin 1 will pass to the opposite side of the machine before the pins 2 and 3 complete a revolution and the candy will not be intercepted by said pins until after it has been drawn entirely across the arc described by the pin 1. The candy then being supported by the hand of the operator and by the pin 1, as shown in Fig. 4 of the drawings, the pin 2 will have been brought to a position just above the candy and the pin 3 to a position just below the same. As the pin 1 now starts back over its path, the movement of the pins 2 and 3 will continue and the candy will be looped about the said pins. As the pin 1 reaches a position substantially in vertical alinement with the pins 4 and 5, the pin 3 will reach a position below the pin 5 and above the pin 1 while the pin 2 will be passing below the pin 4, the candy being thus looped about the pin 4 and being again intercepted by the pin 1, as shown in Fig. 5. The pin 1 now continues its movement back to its initial position and the candy will be stretched between said pin and the pin 3. At the same time, the pin 2 will intercept the candy passing from the pin 1 to the pin 3 and the candy looped about the pin 4 so that the candy will be also stretched between the pins 1 and 4 and will be again looped about the pin 2, as is shown in Fig. 6. The pin 1 now again reverses while the pins 2 and 3 continue their circular travel, the pin 2 now carrying the candy above the pin 5, while the pin 3 will move against the candy stretched upwardly from the pin 4, the pin 1 passing between the pins 2 and 3 as well as between the pins 4 and 5 and also intercepting said candy. This position is shown in Fig. 7. The entire batch of candy will now have been fed to the machine and the machine will continue to automatically loop it successively about the several pins, and as the moving pins recede from the fixed pins the candy will be stretched thoroughly throughout and in the stretching operation will be aerated. When the pins reach the position shown in Fig. 7, the pins 1 and 2 will be traveling to the left, as indicated by the arrows while the pin 3 will be traveling toward the right. The candy between the pins 1 and 4 will be intercepted by the pin 3 and will be stretched, as shown in Fig. 8, between the pins 3 and 4 and also between the pins 3 and 1, while the pin 2, looping the candy about the pin 5, will stretch the same between itself and said pin and the pin 1 will also act upon the candy so as to stretch it between itself and the pin 5. This position is shown in Fig. 8, and the continued movement of the parts will bring them into the position shown in Fig. 9 where the several pins are substantially in vertical alinement and the pin 1 has traveled half way to the right, the pin 2 being below the pin 4 and traveling to the right while the pin 3 is below the pin 5 and traveling to the left. The pin 1 will now stretch the candy between the pins 3 and 4 and the pins 2 and 3 will exert a stretching action respectively upon the candy between themselves and the pins 4 and 5 as will be readily understood from reference to Figs. 10 and 11. The continued movement of the parts will cause the pin 2 to intercept the candy between the pins 1 and 3 and the working members will return to the position shown in Fig. 7 whereupon the cycle illustrated in Figs. 8, 9, 10 and 11 will be again followed. This operation may continue indefinitely until the candy has been stretched according to the wishes of the operator.

It will be readily noted from the foregoing description, taken in connection with the accompanying drawings, that we have provided an exceedingly simple machine in which the candy will be treated throughout its mass and will be quickly brought to the desired merchantable condition without any excessive labor on the part of the operator. It will be noted upon reference to Figs. 8 to 11 that after the complete batch of candy has been fed into the machine it will be stretched to the full extent or capacity of the machine twice during the oscillation of the rocking arm, once when the arm is at the left hand limit of its movement and again when the arm is at the right hand limit of its movement.

It is to be understood that we do not confine ourselves to the exact details of construction illustrated in the accompanying drawings as various minor changes may be made therein without departing from the spirit or scope of the invention as the same is defined in the following claims. Some of the pins may be omitted or they may be otherwise arranged. It will be noted that the stationary pins 4 and 5 are at diametrically opposite points of the paths of the pins 2 and 3 and that any candy which may be supported by the said pins will be intercepted by the pin 3 which describes a circle lying entirely between the stationary pins. Candy carried by the pin 2 will be wrapped around the stationary pins so that if candy will be hung upon the pins 2 and 3 it will be pulled between the said pins and the stationary pins and, if the stationary pins be omitted or should be broken, the candy may be substantially treated by the action of the vibrating or reciprocating pin and the pins moving in circular paths inasmuch as the said pins will describe intersecting arcs and will, of course, engage and loop candy following said arcs.

Having thus described the invention what is claimed as new is:—

1. A candy pulling machine comprising a standard, a vibratory lever fulcrumed upon said standard, a candy engaging pin at the free end of said lever, a rotary arm mounted upon the standard above the fulcrum of the lever, a pin carried by said arm, brackets secured rigidly to the standard respectively above and below said arm, pins fixed to said brackets, and means for rotating said arm and vibrating said lever simultaneously.

2. A candy-pulling machine comprising a support, stationary pins mounted in reëntrant relation to the said support, a rotatable arm mounted upon the support and adapted to move past the ends of said stationary pins, pins carried by the said rotatable arm and movable past the stationary pins above and below the same, and a vibratory lever mounted upon the support and having its free end provided with a pin adapted to move between the stationary pins and intersect the paths of the pins carried by the rotatable arm.

3. In a candy-pulling machine, the combination of a pair of stationary pins, and movable pins coacting with the stationary pins and disposed diametrically opposite each other, one of said pins describing a circle lying entirely between the stationary pins and the other of said movable pins describing a circle inclosing both said stationary pins.

4. In a candy-pulling machine, the combination of a pair of stationary pins, movable pins describing circular paths, one of said paths lying between the stationary pins and the other of said paths inclosing the pair of stationary pins, and an oscillatory pin traversing an arc passing between the stationary pins and intercepting the circular paths of the first-mentioned movable pins.

5. In a candy-pulling machine, the combination of a pair of pins traveling in independent concentric circles, and a vibratory pin traversing an arc intersecting said circles.

6. In a candy-pulling machine, the combination of a pair of movable pins describing concentric circles and in fixed diametrically opposite relation to each other, a pair of stationary pins disposed at diametrically opposite points of a circle located between and concentric with the circular paths of the said movable pins, and a vibratory pin traversing an arc intersecting said circles and passing between the stationary pins.

7. In a candy-pulling machine, the combination of an oscillatory pin, a plurality of pins each traveling in a circular path intersecting the arc described by said oscillatory pin, and stationary pins at the opposite sides of said arc, and circumscribed by the circular path traveled by some of the second-mentioned pins.

8. A candy-pulling machine comprising a plurality of stationary pins, and a plurality of movable pins, the movable pins being arranged some to move between the stationary pins and across the plane of the same and others to travel around all the stationary pins.

9. A candy-pulling machine comprising a support, an arm pivoted on the support, pins projecting from said arm at opposite sides of the pivotal point thereof, stationary pins on the support projecting toward said arm, a lever, a pin on said lever projecting toward the pivoted arm, and means for rotating said pivoted arm and vibrating said lever.

10. In a candy-pulling machine, the combination of a pair of stationary pins, an oscillatory pin describing an arc passing between the stationary pins, and intersecting and terminating at opposite sides of the plane of the same and a pulling pin traveling in a circular path intersecting the arc described by the oscillatory pin.

11. A candy-pulling machine comprising a support, a shaft journaled therein, an arm carried by one end of said shaft, pins carried by said arm at opposite sides of and at unequal distances from said shaft, stationary pins carried by the support at opposite sides of said shaft and located at points between the respective paths of the first-mentioned pins, a second shaft journaled in the support below the first-mentioned shaft, a lever carried by said second shaft and projecting upwardly therefrom in front of and above the lower stationary pin, a pin carried by the upper end of said lever, and means for rotating the first-mentioned shaft and oscillating the second shaft.

In testimony whereof we affix our signatures in presence of two witnesses.

EDWARD F. McCARTHY. [L. S.]
EDWARD W. WILSON. [L. S.]

Witnesses:
JUDITH JOHNSON,
ELVIRA HOGLUND.

Copies of this patent may be obtained for five cents each, by addressing the "Commissioner of Patents, Washington, D. C."